United States Patent
Francik et al.

(10) Patent No.: US 9,550,893 B2
(45) Date of Patent: Jan. 24, 2017

(54) RUBBER PREPARED WITH PRE-TREATED PRECIPITATED SILICA AND TIRE WITH COMPONENT

(71) Applicant: The Goodyear Tire & Rubber Company, Akron, OH (US)

(72) Inventors: William Paul Francik, Bath, OH (US); John Joseph Andre Verthe, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/162,774

(22) Filed: May 24, 2016

(65) Prior Publication Data

US 2016/0264768 A1 Sep. 15, 2016

Related U.S. Application Data

(63) Continuation-in-part of application No. 14/796,386, filed on Jul. 10, 2015.

(60) Provisional application No. 62/041,179, filed on Aug. 25, 2014.

(51) Int. Cl.

| | | |
|---|---|---|
| C08L 25/10 | (2006.01) |
| C08K 3/04 | (2006.01) |
| C08K 3/06 | (2006.01) |
| C08K 5/39 | (2006.01) |
| C08K 5/44 | (2006.01) |
| C08K 9/06 | (2006.01) |

(52) U.S. Cl.
CPC .............. *C08L 25/10* (2013.01); *C08K 3/04* (2013.01); *C08K 3/06* (2013.01); *C08K 5/39* (2013.01); *C08K 5/44* (2013.01); *C08K 9/06* (2013.01); *C08L 2205/02* (2013.01); *C08L 2205/03* (2013.01); *C08L 2312/00* (2013.01)

(58) Field of Classification Search
CPC ............. C08L 25/10; C08K 3/04; C08K 9/06; C08K 5/44; C08K 5/39; C08K 3/06
See application file for complete search history.

(56) References Cited

U.S. PATENT DOCUMENTS

| | | | |
|---|---|---|---|
| 6,936,669 B2 | 8/2005 | Halasa et al. | |
| 7,981,966 B2 | 7/2011 | Kobayashi et al. | |
| 8,217,103 B2 | 7/2012 | Thiele et al. | |
| 8,569,409 B2 | 10/2013 | Thiele et al. | |
| 2003/0015272 A1* | 1/2003 | Teratani | B60C 1/0025 152/406 |

FOREIGN PATENT DOCUMENTS

| | | |
|---|---|---|
| CN | 103289143 A | 9/2013 |
| EP | 2554553 A1 | 2/2013 |

* cited by examiner

*Primary Examiner* — Peter D Mulcahy
(74) *Attorney, Agent, or Firm* — Henry C. Young, Jr.

(57) ABSTRACT

The invention relates to a rubber composition prepared with pre-treated precipitated silica and tire with component comprised of such rubber composition. The rubber composition is comprised of at least one diene-based elastomer and said pre-treated precipitated silica together with a sulfur cure package comprised of elemental sulfur together with 1,6-bis (N,N'-dibenzylthiocarbamoyldithio)-hexane crosslinking agent and sulfenamide accelerator.

19 Claims, No Drawings ically, in one embodiment, such pre-treatment of the precipitated silica may be a reaction product of precipitated silica with a bis(3-trialkoxysilylalkyl)polysulfide or with an alkoxyorganomercaptosilane.

RUBBER PREPARED WITH PRE-TREATED PRECIPITATED SILICA AND TIRE WITH COMPONENT

FIELD OF THE INVENTION

The invention relates to a rubber composition prepared with pre-treated precipitated silica and tire with component comprised of such rubber composition. The rubber composition is comprised of at least one diene-based elastomer and said pre-treated precipitated silica together with a sulfur cure package comprised of elemental sulfur together with 1,6-bis(N,N'-dibenzylthiocarbamyldithio)-hexane crosslinking agent and sulfenamide accelerator.

BACKGROUND OF THE INVENTION

Rubber compositions for components of tires are often comprised of diene-based elastomers which contain filler reinforcement composed of a combination of rubber reinforcing carbon black and precipitated silica. Such precipitated silica is an amorphous synthetic silica which contains hydroxyl groups on its surface.

The precipitated silica with its included hydroxyl groups is hydrophilic in nature and the presence of the included hydroxyl groups causes it to be significantly more polar than less polar diene-based elastomers contained in the rubber composition. The high polarity of the hydrophilic precipitated silica particles causes the silica particles to be more attractive to other hydrophilic precipitated silica particles (causes a high silica-silica attraction) contained in a rubber composition and less attractive to the less polar diene-based elastomers (less silica-elastomer attraction) in the rubber composition.

Therefore, creating an efficient dispersion of the highly polar hydrophilic precipitated silica within the diene-based elastomer-containing rubber composition can be difficult without extensive high shear mixing of the rubber composition. Such difficulty is well known to those having skill in such art.

In practice, in order to promote reinforcement of the diene-based elastomer in the rubber composition by the precipitated silica, a silica coupler is normally added to the rubber composition. The silica coupler contains a moiety (e.g. an alkoxysilane) reactive with the hydroxyl groups on the precipitated silica and another different moiety (e.g. a polysulfide) interactive with the diene-based elastomer(s) contained in the rubber composition. The reaction of such silica coupler with hydroxyl groups on the precipitated silica during the mixing of the rubber composition, therefore an in situ reaction within the rubber composition, reduces the content of the of hydroxyl groups on the silica with a portion of unreacted hydroxyl groups remaining, to thereby render the precipitated silica less polar in nature and therefore more dispersible within the rubber composition.

Sulfur with various combinations of sulfur cure accelerators may be used to cure the precipitated silica-containing, diene rubber based rubber composition where the accelerators are typically composed of a primary accelerator together with a more active secondary accelerator to aid in initiating and promoting the sulfur vulcanization. The rate of sulfur cure of the rubber composition promoted by the sulfur cure accelerators is important in a sense that it must be sufficient to promote curing of the rubber composition within a suitable period of time but must not be too rapid in order to avoid what is sometimes referred to as an unwanted "scorching", or "pre-curing" of the rubber composition.

Representative of primary sulfur cure accelerators are sulfenamide primary sulfur cure accelerators. Representative of such sulfenamide primary sulfur cure accelerators are, for example, N-cyclohexyl benzothiozole-2-sulfonamide, N-dicyclohexyl benzothiazole-2-sulfenamide and N-tert-butyl benzothiazole-2-sulfenamide.

However, such in situ modified precipitated silica retains a degree of its polarity sufficient to attract a portion of later added sulfur cure accelerators to thereby reduce availability of the sulfur cure accelerators and associated rate of cure promoted by the accelerators in the rubber composition. To counteract such reduction in rate of cure activity, a more active diphenylguanidine secondary accelerator is added together with the primary sulfenamide primary accelerator to thereby increase the reduced rate of cure of the rubber composition.

Alternatively, the polar hydrophilic precipitated silica may be pre-treated with a silica coupling agent prior to its introduction into the rubber composition to make it more hydrophobic, to thereby reduce its polarity, making it less polar in nature and to render it more compatible with and thereby more readily dispersible within the less polar diene-based elastomer-containing rubber composition.

It is envisioned that such pre-treatment of the precipitated silica prior to addition to the rubber composition instead of blending silica coupling agent with the precipitated silica within a rubber composition provides a more efficient reaction of the coupling agent with hydroxyl groups on the precipitated silica. Therefore a greater reduction of the concentration of hydroxyl groups on the precipitated silica is provided accompanied by a greater reduction in the polarity of the precipitated silica.

With the greater reduction in polarity of the pre-treated precipitated silica, less sulfur cure accelerator is thereby absorbed onto the pre-treated precipitated silica within the rubber composition during the rubber mixing process and more sulfur cure accelerator remains available for sulfur curing the rubber composition which ultimately promotes both a faster rate of sulfur curing of the rubber composition as well as an adverse increase in the sulfur cure density formation for the rubber composition. In one aspect, such increase of the sulfur cure activity may undesirably promote an excessively faster cure rate for the rubber composition at a lower temperature to an extent that the rubber may partially pre-sulfur cure during the mixing of the rubber composition and prior to a molding and intended curing of the rubber composition. Such undesirable pre-sulfur curing of the rubber composition during its mixing process is sometimes referred to as "scorching". Scorching of the rubber composition during mixing is generally undesirable as is known by those having skill in such art. The increase in sulfur cure density may adversely affect (e.g. reduce) the cured rubber's elongation to break and adversely reduce its tear resistance.

To reduce promotion of unwanted scorching (pre-sulfur curing) of the rubber. composition during its mixing and increase in sulfur crosslink density, it may be readily thought of to simply eliminate presence of the secondary accelerator (e.g. the diphenylguanidine). However, such elimination of the diphenylguanidine secondary accelerator may adversely cause a reduction of various cured rubber properties.

Accordingly, a challenge is presented to provide a sulfur vulcanization system comprised of sulfur and sulfur cure accelerator(s), which includes a sulfenamide primary cure accelerator, where a rubber composition contains a precipitated silica pre-treated with a silica coupler (pre-treated prior to its addition to the rubber composition).

Therefore, it is desired to evaluate an inclusion of a crosslinking agent for a rubber composition comprised of at least one diene-based elastomer and precipitated silica pre-treated with silica coupler where the sulfur cure package is comprised of sulfur and sulfenamide primary cure accelerator. Such crosslinking agent for this evaluation is 1,6-bis (N,N'-dibenzylthiocarbamyldithio)-hexane.

In the description of this invention, the terms "rubber", "elastomer" and "rubbery polymer" may be used interchangeably unless otherwise indicated. The terms "cured" and "vulcanized" may be used interchangeably unless otherwise indicated.

The term "phr" refers to parts by weight of an ingredient per 100 parts by weight of rubber in a rubber composition.

SUMMARY AND PRACTICE OF THE INVENTION

In accordance with this invention, a rubber composition is provided comprised of:

(A) 100 parts by weight of at least one conjugated diene based elastomer, (B) reinforcing filler comprised of rubber reinforcing carbon black and precipitated silica, where said precipitated silica is a composite comprised of a precipitated silica pre-treated with a silica coupling agent, wherein said coupling agent is comprised of:

(1) bis(3-triethoxysilylpropyl) polysulfide having an average of from about 2 to about 4 connecting sulfur atoms in its polysulfidic bridge, or (2) an alkoxyorganomercaptosilane, and (C) sulfur curative comprised of sulfur, 1,6-bis (N,N'-dibenzylthiocarbamyldithio)-hexane crosslinking agent and sulfenamide (primary) sulfur cure accelerator, exclusive of diphenyl guanidine (secondary) sulfur cure accelerator and which desirably exclude secondary sulfur cure accelerators.

Representative examples of sulfenamide sulfur cure accelerators are comprised of, for example, at least one of N-tert-butyl benzothiazole-2-sulfenamide, N-oxydiethylene benzothiazole-2-sulfenamide, N-cyclohexyl benzothiazole-2-sulfenamide and N-tert-benzothiazole-2-sulfenamide, preferably comprised of N-cyclohexyl benzothiazole-2-sulfenamide or N-tert-butyl-2-benzothiazole sulfenamide and more desirably N-cyclohexyl benzothiazole-2-sulfenamide, which desirably excludes secondary sulfur cure accelerators.

In one embodiment, the rubber composition does not contain (is exclusive of) other sulfur vulcanization accelerators, particularly secondary sulfur cure accelerators such as, for example, the aforesaid diphenyguanidine, as well as tetramethyl thiuram disulfide, tetramethyl thiruam monosulfide, zinc dimethyldithiocarbamate, tetraisobutyl thiruam disulfide, tetraisobutyl thiuram monosulfide, tetrabenzyl thiuram disulfide, zinc didibenzyldithiocarbamate and di-o-tolyguanidine.

In further accordance with this invention, a tire is provided containing a component comprised of such rubber composition, particularly a sulfur cured rubber composition.

It is intended that the rubber composition is exclusive of butyl type rubber, particularly copolymers of isobutylene with a minor content of diene hydrocarbon(s) such as for example isoprene and halogenated butyl rubber.

In practice, various conjugated diene-based elastomers may be used for the rubber composition such as, for example, polymers and copolymers of at least one of isoprene and 1,3-butadiene and of styrene copolymerized with at least one of isoprene and 1,3-butadiene.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers.

Representative of functionalized elastomers are, for example, styrene/butadiene elastomers containing one or more functional groups comprised of (A) amine functional group reactive with hydroxyl groups on said precipitated silica, (B) siloxy functional group, including end chain siloxy groups, reactive with hydroxyl groups on said precipitated silica, (C) combination of amine and siloxy functional groups reactive with hydroxyl groups on said precipitated silica, (D) combination of thiol and siloxy (e.g. ethoxysilane) functional groups reactive with hydroxyl groups on said precipitated silica, (E) combination of imine and siloxy functional groups reactive with hydroxyl groups on said precipitated silica, (F) hydroxyl functional groups reactive with said precipitated silica.

For the functionalized elastomers, representative of amine functionalized SBR elastomers are, for example, in-chain functionalized SBR elastomers mentioned in U.S. Pat. No. 6,936,669.

Representative of a combination of amino-siloxy functionalized SBR elastomers with one or more amino-siloxy groups connected to the elastomer is, for example, HPR355™ from JSR and amino-siloxy functionalized SBR elastomers mentioned in U.S. Pat. No. 7,981,966.

Representative styrene/butadiene elastomers end functionalized with a silane-sulfide group are, for example, mentioned in U.S. Pat. Nos. 8,217,103 and 8,569,409.

Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers including the aforesaid functionalized styrene/butadiene elastomers.

Commonly employed synthetic amorphous silica, or siliceous pigments, used in rubber compounding applications can be used as the precipitated silica for this invention.

The precipitated silica aggregates employed in this invention are typically obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, (1938), as well as ASTM D5604 for precipitated silica.

The silica may also be typically characterized, for example, by having a dibutylphthalate (DBP) absorption value in a range of about 50 to about 400 cc/100 g, and more usually about 100 to about 300 cc/100 g (ASTM D2414).

Various commercially available precipitated silicas may be considered for use in this invention such as, only for example herein, and without limitation, silicas from PPG Industries under the Hi-Sil trademark with designations such as Hi-Sil 210, Hi-Sil 243, etc.; silicas from Solvay as, for example, Zeosil 1165MP; silicas from Evonic with, for example, designations VN2 and VN3, as well as other grades of silica, particularly precipitated silicas, which can be used for elastomer reinforcement.

Various coupling agents may be used if desired to aid in coupling the precipitated silica (e.g. the precipitated silica containing hydroxyl groups on its surface) including, for example, coupling agents comprised of bis(3-triethoxysilyl-propyl) polysulfide containing an average of from about 2 to about 4, alternately from about 2 to about 2.6 and alternately from about 3.4 to about 3.8, connecting sulfur atoms in its polysulfidic bridge, and comprised of alkoxyorganomercap-tosilanes.

Representative examples of various alkoxyorganomer-captosilane silica couplers are, for example and not intended to be limiting, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

It is readily understood by those having skill in the art that the rubber composition would be compounded by methods generally known in the rubber compounding art, such as mixing the various sulfur-vulcanizable constituent rubbers with various commonly used additive materials including the aforesaid sulfur and N-cyclohexyl-2-benzothiazolesulfe-namide curatives together with a sulfenamide sulfur cure accelerator.

Various processing additives may be used, where appropriate, such as for example, rubber processing oils, various resins including tackifying resins, pigments, plasticizers, fatty acids, zinc oxide, waxes, antioxidants and antiozonants, peptizing agents and reinforcing fillers materials such as, for example, the aforementioned rubber reinforcing carbon black and precipitated silica. As known to those skilled in the art, depending on the intended use of the sulfur vulcanizable and sulfur vulcanized material (rubbers), the additives mentioned above are selected where appropriate and commonly used in conventional amounts.

Typical amounts of tackifier resins, if used, may, for example, comprise about 0.5 to about 10 phr, usually about 1 to about 5 phr. Typical amounts of processing aids, if used, may comprise, for example from about 1 to about 50 phr. Such processing aids can include, for example and where appropriate, aromatic, naphthenic, and/or paraffinic processing oils. Typical amounts of antioxidants where used may comprise, for example, about 1 to about 5 phr. Representative antioxidants may be, for example, diphenyl-p-phe-nylenediamine and others, such as, for example, those disclosed in *The Vanderbilt Rubber Handbook* (1978), Pages 344 through 346. Typical amounts of antiozonants, where used, may comprise for example about 1 to 5 phr. Typical amounts of fatty acids, if used, which can include stearic acid and more commonly combinations of stearic acid with one or more of palmitic acid and oleic acid and may comprise, for example, from about 0.5 to about 3 phr. Typical amounts of zinc oxide may comprise, for example, from about 1 to about 10 phr. Typical amounts of waxes, such as for example microcrystalline waxes, where used, may comprise, for example, from about 1 to about 5 phr. Typical amounts of peptizers, where used, may comprise, for example, from about 0.1 to about 1 phr.

The presence and relative amounts of the above additives are not considered to be an aspect of the present invention, unless otherwise indicated herein.

The mixing of the rubber composition can be accomplished by methods known to those having skill in the rubber mixing art. For example, the ingredients are typically mixed in at least two stages, namely, at least one sequential non-productive mixing stage followed by a productive mix stage. The final curatives (sulfur and sulfenamide cure accelerator) are typically mixed in the final mixing stage which is conventionally called the "productive" mix stage in which the mixing typically occurs at a temperature, or ultimate temperature, lower than the mix temperature(s) than the preceding non-productive mix stage(s). The terms "non-productive" and "productive"

The following example is provided to further illustrate the invention. Parts and percentages, where used, are by weight unless otherwise indicated.

EXAMPLE I

In this example, conjugated diene-based elastomer-containing rubber compositions are prepared which contain precipitated silica reinforcement.

Rubber Sample A is a Control rubber sample containing precipitated silica reinforcement treated in situ within the rubber composition with a silica coupling agent and cured with a cure package composed of sulfur and sulfur cure accelerators composed of a primary sulfenamide accelerator and a secondary diphenylguanidine accelerator.

Experimental rubber Samples B through E are provided with the precipitated silica having been pre-treated with a silica coupling agent prior to its addition to the rubber composition.

Experimental rubber Sample B is similar to Control rubber Sample A except for the pre-treated precipitated silica. It used the same cure package of sulfur and cure accelerators composed of sulfenamide and diphenylguanidine.

Experimental rubber Sample C is similar to Experimental rubber Sample B except that a significantly reduced secondary accelerator diphenylguanidine was used.

Experimental rubber Sample D is similar to Experimental rubber Sample C except that an alternative sulfenamide accelerator was used.

Experimental rubber Sample E is similar to Experimental rubber Samples B and C except that a zinc dibenzyl dithiocarbamate secondary accelerator was used with a reduced amount of sulfenamide accelerator and without the diphenylguanidine secondary accelerator.

Experimental rubber Sample F is similar to Experimental rubber Samples B and C except that 1,6-bis (N,N'-diben-zylthiocarbamoyldithio)-hexane crosslinking agent is included with a reduced amount of sulfenamide accelerator and without the diphenylguanidine secondary accelerator.

The compositions were prepared by mixing the ingredients in several stages, namely, two sequential non-productive (NP) stages (without the curatives) followed by a productive (P) mix stage (for adding the sulfur curatives), then the resulting composition was cured under conditions of elevated pressure and temperature.

For the non-productive mixing stages, the ingredients, including the elastomers and particulate reinforcing filler, namely the precipitated silica, are mixed for about four minutes to an elevated temperature. In a final productive mixing stage the curatives are mixed with the rubber composition (mixture) in an internal rubber mixer; namely, the sulfur and sulfur cure accelerator(s) to a temperature of less than the aforesaid elevated temperature, namely to about 110° C., for about three minutes. The rubber compositions were vulcanized at a temperature of about 160° C. for about 14 minutes.

The following Table 1 summarizes ingredients used for the rubber Samples A through F.

TABLE 1

| Materials | Parts by Weight |
|---|---|
| Non-Productive Mixing (NP) | |
| Styrene/butadiene rubber (S-SBR)[1] | 60 |
| Natural cis 1,4-polyisoprene rubber(NR)[2] | 25 |
| Cis 1,4-polybutadiene rubber[3] | 15 |
| Carbon black, rubber reinforcing[4] | 3 |
| Zinc oxide | 0.9 to 3 |
| Fatty acid[5] | 1 to 3 |
| Precipitated silica[6] | 75 |
| Pre-treated precipitated silica[7] | 78.8 |

TABLE 1-continued

| Materials | Parts by Weight |
|---|---|
| Silica coupling agent[8] | 0 to 6 |
| Rubber processing oil | 16 |
| Productive Mixing (P) | |
| Sulfur | 0.5 to 3 |
| Primary sulfur cure accelerator[8a-b] | 1.7 to 3 |
| Secondary sulfur cure accelerator[9a-b] | 0.2 to 1.8 |
| 1,6-bis (N,N'-dibenzylthiocarbamoyldithio) hexane | 0 to 2.1 |

TABLE 1-continued

| Materials | Parts by Weight |
|---|---|

[1]Organic solvent solution polymerization prepared ethoxysilane/thiol functionalized, tin coupled, styrene/butadiene rubber as Sprintan SLR4602 ™ by Styron having a bound styrene content of about 21 percent and Tg (glass transition temperature) of about −25° C.
[2]Natural cis 1,4-polyisoprene rubber as SMR20
[3]Cis 1,4-polybutadiene rubber as Bud1207 ™ from The Goodyear Tire & Rubber Company
[4]Rubber reinforcing carbon black as N220, an ASTM designation
[5]Fatty acid comprised of stearic, palmitic and oleic acids
[6]Precipitated silica as Zeosil 1165MP ™ from Solvay
[7]Pre-treated silica as Agilon 400 ™ from PPG, a precipitated silica pre-treated with an alkoxyorganomercaptosilane coupling agent
[8]Silica coupling agent comprised of bis(3-triethoxysilylpropyl) polysulfide having an average connecting sulfur atoms in a range of from about 2 to about 2.6 in its polysulfidic bridge as 266 ™ from Evonik
[9a]N-cyclohexylbenzothiazole-2-sulfenamide
[9b]N-tert-butyl-2-benzothiazole sulfenamide
[10a]Diphenyl guanidine
[10b]Zinc dibenzyl dithiocarbamate Various physical properties are reported in Table 2 for the rubber compositions for Control rubber Sample A and Experimental rubber Samples B through F.

TABLE 2

| | Rubber Samples | | | | | |
|---|---|---|---|---|---|---|
| | Control (phr) | Experimental (phr) | | | | |
| | A | B | C | D | E | F |
| Non-Productive Mixing (NP1 + NP2) | | | | | | |
| Zinc oxide | 3 | 0.9 | 0.9 | 0.9 | 0.9 | 0.9 |
| Precipitated silica | 75 | 0 | 0 | 0 | 0 | 0 |
| Pre-treated precipitated silica | 0 | 78.8 | 78.8 | 78.8 | 78.8 | 78.8 |
| Silica coupler | 6 | 0 | 0 | 0 | 0 | 0 |
| Productive mixing (P) | | | | | | |
| Zinc oxide | 0 | 0.9 | 0.9 | 0.9 | 0.9 | 0.9 |
| Sulfur | 1.5 | 1.5 | 2 | 2 | 1.7 | 0.8 |
| Primary Sulfenamide Accelerators | | | | | | |
| N-cyclohexylbenzothiazole-2-sulfenamide | 2 | 2 | 3 | 0 | 1.7 | 0.8 |
| N-tert-butyl-2-benzothiazole sulfenamide | 0 | 0 | 0 | 2.5 | 0 | 0 |
| Elements of Sulfur Cure Package | | | | | | |
| Zinc dibenzyl dithiocarbamate | 0 | 0 | 0 | 0 | 0.2 | 0 |
| Diphenyl guanidine | 1.8 | 1.8 | 0.5 | 0.5 | 0 | 0 |
| 1,6-bis (N,N'-dibenzyltiocarbamyldithio)-hexane | 0 | 0 | 0 | 0 | 0 | 2.1 |
| Properties | | | | | | |
| Scorch | | | | | | |
| T + 5, (minutes) | 26.1 | 12 | 28.2 | 35.6 | 29.2 | 37 |
| T25 at 150° C. (minutes) | 5.8 | 2.7 | 3.8 | 5.6 | 4.1 | 5.3 |
| T90 at 150° C. (minutes) | 13.3 | 6.8 | 8.7 | 11.3 | 10.3 | 10.9 |
| ATS | | | | | | |
| 200% ring modulus (MPa) | 6.9 | 7.7 | 10 | 9.6 | 7.1 | 5.9 |
| Tensile strength (MPa) | 17 | 14.1 | 14.3 | 13.6 | 12.9 | 14.7 |
| Elongation at break (%) | 431 | 325 | 275 | 295 | 320 | 405 |
| Rebound, ATS, (room temperature, 23° C.) | 34.5 | 40.1 | 38.3 | 37.8 | 39 | 43.1 |
| DIN Abrasion (relative volume loss) | 107 | 65 | 77 | 74 | 68 | 60 |

From Table 2 the following observations are presented:

(A) Rubber Sample A is a Control rubber sample containing precipitated silica reinforcement treated in situ within the rubber composition with a silica coupling agent and cured with a cure package composed of sulfur and sulfur cure accelerators composed of a primary sulfenamide accelerator and a secondary diphenylguanidine accelerator.

(B) In rubber Sample Experimental B, the silica and coupling agent of rubber Sample Control A has been replaced with a pre-treated precipitated silica, namely a precipitated silica pre-treated with an alkoxyorganomercaptosilane coupling agent. The sulfur cure system (sulfur cure package) remained the same as for the rubber Sample Control A (namely sulfur together with combination of sulfenamide and diphenylguanidine accelerators) for a purpose of comparing only the change in silica types. It is seen in Table 2 that, for the rubber Sample Experimental B, the rebound value (at RT, namely at room temperature) was improved by 6 points indicating a beneficial improvement (reduction) in predictive rolling resistance for a tire with a tread of such rubber composition. However, both the scorch time (minutes) for the uncured rubber and elongation to break for the cured rubber were significantly reduced as compared to Control rubber Sample A which were undesirable results as being predictive of both an undesirable increase in preliminary curing of the rubber composition and difficulty of uncured rubber processing. The abrasion resistance (DIN abrasion test) for the cured rubber was significantly improved compared to Control rubber Sample A.

(C) In rubber Sample Experimental C, by significantly reducing the diphenylguanidine secondary sulfur cure accelerator to 0.5 phr instead of 1.8 phr, the scorch time (minutes) was beneficially increased. However, the elongation to break for the cured rubber continued to be undesirably reduced as compared to Control rubber Sample A which is an undesirable trend. The room temperature (RT) rebound physical property of the cured rubber was similar to the value for Experimental (Experimental) rubber Sample B and the abrasion resistance (DIN abrasion test) for the cured rubber was significantly improved.

(D) For rubber Sample Experimental D, a different sulfenamide than the sulfenamide used in rubber Samples Control A and Experimental B and C was used. The scorch time for rubber Sample Experimental D was beneficially increased as compared to rubber Sample Experimental C and was similar to the T90 value of Control rubber Sample A. However, the elongation to break for the cured rubber continued to be undesirably reduced as compared to Control rubber Sample A which is an undesirable trend. The room temperature (RT) rebound physical property of the cured rubber was similar to the value for Experimental rubber Sample B and the abrasion resistance (DIN abrasion test) for the cured rubber was significantly improved.

(E) For rubber Sample Experimental E, a different secondary accelerator as "zinc dibenzyl dithiocarbamate" was used instead of the amine based diphenyl guanidine together with the primary sulfenamide accelerator. The scorch time was beneficially similar to Control rubber Sample A and the rebound property (RT) was beneficially improved compared to Control rubber Sample A. The abrasion resistance (DIN abrasion test) for the cured rubber was significantly improved compared to Control rubber Sample A, although the elongation to break was still reduced which could potentially promote a reduction in tear resistance for the cured rubber composition for a tire component rendering the substituted secondary accelerator undesirable.

(F) For rubber Sample Experimental F, a 1,6-bis (N,N'-dibenzyltiocarbamoyldithio)-hexane was used as a crosslinking agent together with the sulfur curative and primary sulfenamide accelerator without the amine based diphenylguanidine secondary accelerator. It was discovered that many of physical properties were substantially the same and some were actually significantly improved as compared to the rubber Sample Control A, including a beneficially longer scorch time giving greater rubber processing tolerance for the uncured rubber, together with beneficially improved rebound (RT) and abrasion resistance for the cured rubber while achieving a somewhat similar elongation to break value which was evident when using aforesaid sulfenamide sulfur cure accelerator without the diphenylguanidine secondary sulfur cure accelerator but with the 1,6-bis (N,N'-dibenzyltiocarbamoyldithio)-hexane crosslinking agent.

While the effect of the 1,6-bis (N,N'-dibenzyltiocarbamoyldithio)-hexane may not be completely understood, it is apparent that it has acted as a crosslinker rather than a sulfur cure accelerator with a significant discovery that a satisfactory rubber composition can be prepared comprised of the diene-based elastomer, pre-treated precipitated silica and cure package composed of sulfur, with an inclusion of the 1,6-bis (N,N'-dibenzyltiocarbamoyldithio)-hexane as a crosslinking agent together with a sulfenamide sulfur cure accelerator, without use of a diphenylguanidine secondary sulfur cure accelerator, to achieve suitable, or satisfactory, scorch cure times for the uncured rubber composition in combination with acceptable cured rubber physical properties. It is considered that this effect is a discovery made and demonstrated by the significant experimentation.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of:
   (A) 100 parts by weight of at least one conjugated diene based elastomer,
   (B) Reinforcing filler comprised of a combination of rubber reinforcing carbon black and precipitated silica, where said precipitated silica is a composite comprised of a precipitated silica pre-treated with a silica coupling agent prior to its introduction into the rubber composition, wherein said coupling agent is comprised of:
      (1) bis(3-triethoxysilylpropyl) polysulfide having an average of from about 2 to about 4 connecting sulfur atoms in its polysulfidic bridge, or
      (2) an alkoxyorganomercaptosilane, and
   (C) Sulfur curative comprised of sulfur, crosslinking agent consisting of 1,6-bis (N,N'-dibenzylthiocarbamyldithio)-hexane and sulfur cure accelerator consisting of sulfenamide,
   wherein said sulfenamide sulfur cure accelerator is comprised of N-cyclohexyl benzothiazole-2-sulfenamide or N-tert-butyl-2-benzothiazole sulfenamide.

2. The rubber composition of claim 1 wherein said sulfenamide sulfur cure accelerator is comprised of N-cyclohexyl benzothiazole-2-sulfenamide.

3. The rubber composition of claim 1 wherein said precipitated silica is a composite comprised of a precipitated silica pre-treated with a silica coupling agent comprised of bis(3-triethoxysilylpropyl) polysulfide having an average of from about 2 to about 4 connecting sulfur atoms in its polysulfidic bridge.

4. The rubber composition of claim 1 wherein said precipitated silica is a composite comprised of a precipitated silica pre-treated with a silica coupling agent comprised of an alkoxyorganomercaptosilane.

5. The rubber composition of claim 1 wherein said conjugated diene-based elastomer is comprised of at least one of cis 1,4-polyisoprene, cis 1,4-polybutadiene, styrene/butadiene, isoprene/butadiene and styrene/isoprene/butadiene elastomers.

6. The rubber composition of claim 5 wherein at least one of said elastomers is tin coupled.

7. The rubber composition of claim 6 wherein said conjugated diene-based elastomer is comprised of at least one of cis 1,4-polyisoprene, cis 1,4-polybutadiene and styrene/butadiene elastomers and wherein at least one of said elastomers is a functionalized styrene/butadiene elastomer containing one or more one or more functional groups comprised of:
- (A) amine functional group reactive with hydroxyl groups on said precipitated silica,
- (B) siloxy functional group, including end chain siloxy groups, reactive with hydroxyl groups on said precipitated silica,
- (C) combination of amine and siloxy functional groups reactive with hydroxyl groups on said precipitated silica,
- (D) combination of thiol and siloxy functional groups reactive with hydroxyl groups on said precipitated silica,
- (E) combination of imine and siloxy functional groups reactive with hydroxyl groups on said precipitated silica, and
- (F) hydroxyl functional groups reactive with said precipitated silica.

8. The rubber composition of claim 7 wherein at least one of said functionalized elastomers is tin coupled.

9. A sulfur cured rubber composition of claim 1.

10. A sulfur cured rubber composition of claim 3.

11. A sulfur cured rubber composition of claim 4.

12. A sulfur cured rubber composition of claim 5.

13. A sulfur cured rubber composition of claim 6.

14. A sulfur cured rubber composition of claim 7.

15. A tire having a component comprised of the rubber composition of claim 9.

16. A tire having a component comprised of the rubber composition of claim 10.

17. A tire having a component comprised of the rubber composition of claim 11.

18. A tire having a component comprised of the rubber composition of claim 12.

19. A tire having a component comprised of the rubber composition of claim 14.

* * * * *